United States Patent Office 2,982,993
Patented May 9, 1961

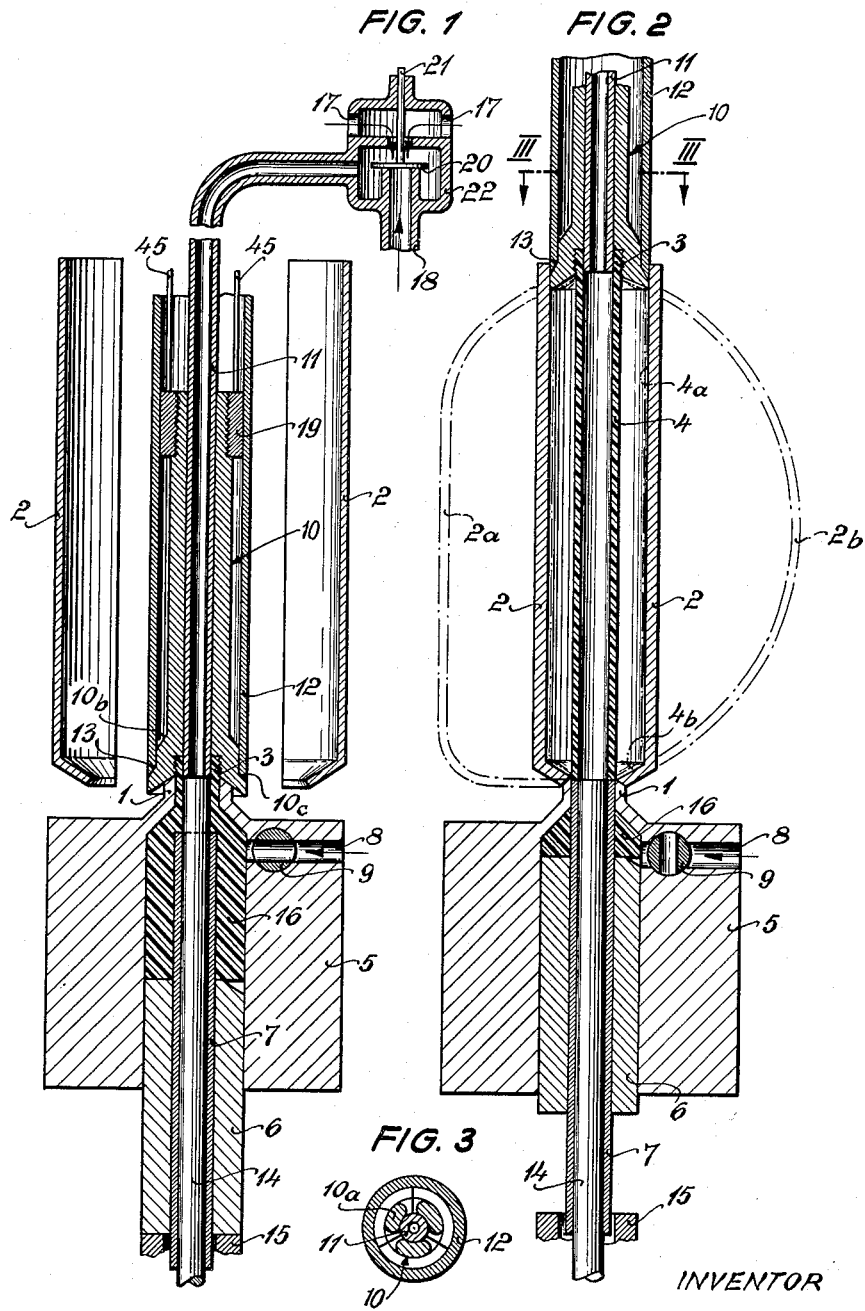

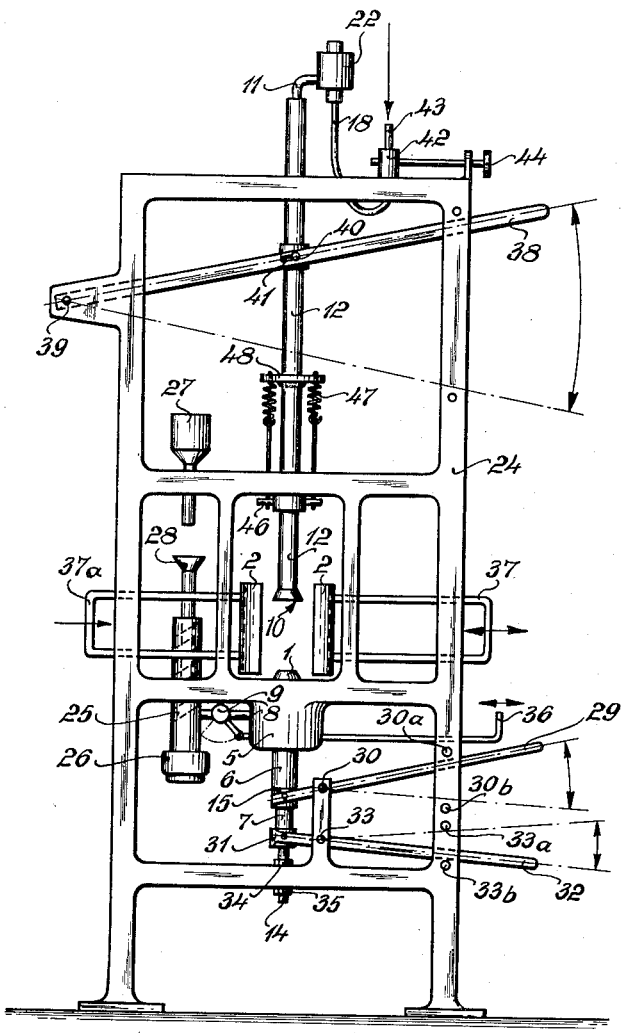

2,982,993
APPARATUS FOR PRODUCING TUBES OF SYNTHETIC MATERIAL

Hans Jacobi, Schwaig, near Nurnberg, Germany, assignor to Ossberger Turbinenfabrik, Weissenburg, Bavaria, Germany Filed June 3, 1957, Ser. No. 663,186

Claims priority, application Germany June 9, 1956

2 Claims. (Cl. 18—5)

This invention relates to a method of producing tubes made of synthetic material and the like, in which synthetic material is forced through a ring-type nozzle into a head mould receiving the tube head and the tube wall is formed by moving the head mould away from the nozzle inside a wall mould defining the tube wall and by inflating the synthetic material emerging from the ring-type nozzle. In a known method of this kind, the synthetic material is fed from a worm or piston-operated press, when, after emerging from the nozzle, it first forms the tube head and thereupon, as its distance from the tube head and the nozzle increases, the tube wall. The tube formed in this manner has the disadvantage, that the tube head formed with a thread will not be sufficiently sharply pressed out and that the tube wall will not be uniformly thin. More particularly, the part of the tube wall adjoining the tube head will frequently be of greater wall thickness than the remainder of the tube wall, which is frequently of disadvantage later, when the tube is in use.

The invention has for its object to avoid the above and other disadvantages and consists in the first place in that, when forcing the synthetic material into the head mould, the pressure acting on the synthetic material is reduced before the commencement of the removal of the head mould away from the nozzle to at least that pressure which corresponds to the desired extrusion velocity and the speed, at which the tube head and nozzle recede from one another during extrusion. The pressure is reduced, for instance, from about 3 above atmospheric to 0.1 to 0.5.

As the warm synthetic material is elastic, that is to say as it expands, when the pressure bearing on it is relieved, the object of the invention is attained in a particularly perfect manner so that for the extrusion of each tube only about as much heated synthetic material is placed under pressure as is required for the production of one tube.

It will also be found to contribute to the obtaining of uniform wall thickness and equal wall quality over the entire length of the tube, if, according to a further feature of the invention, the preliminary tube body extruded under reduced pressure out of a nozzle of preferably the same diameter as the tube head be inflated, only after attaining its full length, until it bears against the mould wall. With this mode of operation, it becomes possible also to produce tubes with closed ends, if before or after the inflation, the tube body be constricted with a noose or the like immediately behind the nozzle with the object of forming a closed tube end. By the substitution for the wall mould of some other flask-shaped or bag-like mould, it becomes possible to produce by the present method, flasks and bags as well.

The invention also relates to a device for carrying out the method. It is based on a known device which comprises a head mould, a wall mould, a ring-type nozzle which is movable away from the head mould and a supply pipe for the synthetic material to the ring-type nozzle.

Such a device for carrying out the method according to the invention is preferably so constructed that in front of the ring-type nozzle, there is provided a space which is adapted to be shut off and the volume of which can be varied.

A threaded tube head often becomes damaged, when being unscrewed in the hihterto usual manner from the head mould, so that the advantage of the accurate pressing of the tube head in accordance with the invention is sacrificed again. In order to avoid this disadvantage, according to a further feature of this invention, the head mould is constructed as a multipart mould, preferably so as to comprise three segments capable of being spread apart, which can be closed and opened in the manner of a drill chuck, combined with a relative axial motion of a closing casing.

The invention shall now be described with reference to the accompanying drawings which represent a constructional example of a device for carrying out the method and in which:

Figure 1 shows an axial section through a device according to the invention after the extrusion of the tube head;

Figure 2 a corresponding axial section after the completed extrusion of the tube wall blank, before the inflation of the tube wall;

Figure 3 a section on line III—III of Figure 2 and

Figure 4 the complete device in elevation.

On a frame 24 of angle iron (see Figure 4) is mounted a press cylinder 5. In this press cylinder heated synthetic material can be forced through a supply pipe 8 which can be shut off by means of a shut-off member 9. For operating this shut-off member 9, a push rod 36 is provided, which is adapted to be pushed to and fro in the direction of its longitudinal axis. For forcing in the synthetic material, there is a worm-operated press 25 which is adapted to be driven by an electric motor 26 and to which the synthetic material is supplied from a supply container 27 by way of a funnel 28. Into the lower end of the cylinder 5 a ring-shaped extrusion piston 6 can be forced with the aid of a ring-shaped stop member 15 which can be moved upwards and downwards by a hand lever 29. The hand lever 29 is pivoted at 30. The extent of its rocking motion is limited by stops 30a and 30b. Out of the bottom of the extrusion piston 6 extends the end of a shut-off pipe or conduit 7 which is connected with a ring 31 which can be moved upwards and downwards by means of a hand lever 32. The hand lever 32 is pivoted at 33. The angular extent of its motion is limited by the stops 33a and 33b. The lower end of the mandrel 14 which projects out of the shut-off pipe is fixed by means of two adjustable nuts 34 and 35 to the frame 24, so that the mandrel can be fixed higher or lower according to requirement. In Figure 4 is also shown the nozzle neck 1. Wall parts 2 which give the inflated tube 2 its shape are moved out sideways. The inward and outward movement is produced by means of hand-operated sliding members 37 and 37a. From the raised closing sleeve 12 extend the lower ends of three segments 10 which, as is explained below, serve the purpose of forming the tube head. The closing sleeve 12 can be moved upwards and downwards by means of a hand lever 38 which is pivoted at 39. It is provided for this purpose with two pins 40 which engage in a longitudinal slot 41 of the lever 38. Out of the top of the closing sleeve 12 extends an air supply tube or tubular shaped port 11 which is connected by bridge members (not shown) rigidly with the closing sleeve 12 and supports an automatically acting valve 22. To this valve is connected a flexible compressed air tube 18 which establishes the connection with a hand-operated valve 42, into which compressed air can be forced at 43. The valve 42 can be opened or closed by the hand-operated member 44. The ring-type extrusion nozzle (Figure 1) is formed by the nozzle neck 1 and the mandrel 14. In the bore of the cylinder 5 is the synthetic material 16 required for the production of a single tube. In the cylinder bore is slidable the ring-type extrusion piston 6 which slides on the shut-off pipe 7 which is itself longitudinally displaceable on the mandrel 14. The shut-off pipe 7 has a wall thickness which is such that it can shut off the annular nozzle outlet formed between the nozzle neck 1 and the mandrel 14. The shut-off member 9 is shown in Figure 2 in the closed position and in Figure 1 in the opened position.

The head mould for the formation of the tube head consists of three segments 10 and the air supply pipe 11. The three segments close together to form a ring, when they bear centrally against the air supply pipe 11. Each of the three segments 10 is mounted on the end of a resilient arm 10a. The resilient arms 10a endeavor to spread outwards. The upper ends of the arms are held together firmly by a bushing 19 and are adapted to slide on the air supply pipe 11. The bushing 19 is longitudinally movable with respect to the closing sleeve 12 and is suspended on two rods 45 which are fixed to a pin 46 which is adapted to be moved upwards and downwards in the longitudinal slot of the closing sleeve 12. The pin 46 is suspended by means of tension springs 47 from a ring 48 which is fixed on the sleeve 12. This closing sleeve 12 serves the purpose of closing the segments 10. For this purpose, the segments 10 have conical external surfaces 10b and 10c. When the segments 10 are moved downwards relatively to the closing sleeve 12, the segments 10 will spread outwards, owing to the spring force of the arms 10a. When the segments 10 are displaced upwards relatively to the closing sleeve, the segments will close, when their conical surfaces 10b slide along the upper rim of the closing sleeve. At the end of the movement the conical surfaces 10c press against the rim of the closing sleeve and are in this way pressed against one another firmly in the circumferential direction. The hollow space for the formation of the tube head 3 is thus circumscribed by the three segments 10 and the lower end of the air supply pipe 11, forming the core of the mould. The wall mould, against which the forward part 4 of the tube bears during inflation, consists of the two parts 2 which can be moved outwards radially. When bags or flasks are to be made instead of tubes, the wall moulds 2 are replaced by wall moulds 2a or 2b, as shown in Figure 2 in the dot and dash lines.

On the upper rim of the pressure supply pipe 18 in the valve casing 22 rests a valve plate 20 which is guided by a valve shank 21. The valve casing 22 has apertures 17 for the admission of outside air. In the position shown in Figure 1, the interior of the air supply pipe 11 is thus in communication with the outer air. When, through opening the valve 42, compressed air is admitted into the pipe 18, the compressed air will lift the valve plate 20 and thereby shut off the inner space of the valve from the outer air, so that the compressed air can now flow only through the air supply pipe 11.

For the production of a tube, the device is first brought into the position shown in Figure 1. With the valve 9 opened, heated synthetic material is then forced through the supply pipe 8 out of the worm-operated press 25 into the cylinder 5, for instance at a pressure of 3 atmospheres. This causes the piston to move downwards, until it strikes the bottom stop 15. As soon as the piston 6 has struck the stop 15, a pressure will be built up in the cylinder 5, which corresponds to the original pressure of the fed-in synthetic material, that is to say, the synthetic material reaches the head mould at about 3 atmospheres pressure, causing the tube head 3 to form. Thereupon the shut-off member 9 is closed. In the cylinder 5, however, the pressure of 3 atmospheres will persist. Now, if the extrusion of the forward part of the tube wall 4, the segments 10 with the air supply pipe 11 being drawn upwards, a strong outflow of synthetic material would at first take place, as the mass of synthetic material present in the cylinder 5 would rapidly expand through the nozzle. To prevent this happening, according to the invention, the stop 15 is first lowered after the closing of the shut-off member 9, so that the piston 6 can move downwards under the pressure of the synthetic material 16. Only when the synthetic material has expanded to a pressure which will produce the desired low outflow velocity, a start is made with the extrusion of the forward part of the tube wall 4. For this purpose, the piston 6 is moved upwards with slight force, so that the pressure required for the desired outflow velocity is always maintained. This may lie, for instance, between 0.1 and 0.5 of an atmosphere. The velocity at which the tube head mould simultaneously moves upwards into the position to be seen in Figure 2, is attuned to the velocity, with which the synthetic material 16 leaves the cylinder 5. During this part of the operation, the tube head must sensitively follow the extrusion velocity. Should it leave the nozzle defined by the neck 1 and the mandrel 14 with greater velocity than the extrusion velocity, the forward part of the tube 4 would be expanded, so that it would become constricted in the middle. Should it, however, leave at a smaller velocity, the forward part of the tube wall 4 would be compressed. Both occurrences are to be avoided, as both the expansion and the compression would lead to unequal wall thicknesses. When the tube head 3 has reached the position shown in Figure 2, the extrusion of synthetic material is stopped and the parts 2 of the wall mould are brought into the position shown in Figure 2. Thereupon, compressed air is supplied by the pipe 11 through the valve 42 being opened. Simultaneously with the admission of the compressed air, the shut-off pipe 7 is pushed upwards. At the same time, it forces out the quantity of synthetic material still in the nozzle neck 1. Thus, while the forward part of the tube wall 4 is expanded, owing to the air pressure, so that its wall thickness becomes reduced until it bears in the form of a thin foil 4a against the wall of the wall mould 2, and the remaining quantity of synthetic material extruded by the shut-off pipe 7 forms a foil 4b. Thus, the annular nozzle is equal to the volume necessary to form a base for the tube. The foil has a double significance. In the first place, during the inflation of the tube wall 4, it shuts off the interior of the tube wall 4 towards the bottom. On the other hand, the foil piece 4b may also be used for the formation of a closed end, which will be more particularly explained below.

Through the sliding upwards of the shut-off pipe 7 the formed tube wall 4 or 4a is substantially separated from the remaining contents of the cylinder 5 (see Figure 2). For the removal of the now finished tube, the segments 10 are lowered somewhat out of the position shown in Figure 2, during which. The air supply pipe 11 and the closing pipe 12 remain stationary and the wall moulds 2 are moved outwards into the position shown in Figure 1. This causes the tube wall to be freed from the wall moulds 2 and the tube head 3 is pushed down by the end of the pipe 11 and is freed from the segments 10, as these segments spread apart. The tube will thus fall down freely.

If the tube is to be closed at the bottom before its removal, the parts 2 are removed by a small amount from the nozzle neck 1, namely so far that a noose or the like can be inserted into the gap thus formed, which constricts the foil 4b concentrically. The noose itself may, for instance, be formed by a filament of synthetic material, so that a tube with closed end is obtained. This is of special importance, when flasks or bags according to 2a or 2b are to be made instead of tubes.

I claim:
1. An assembly for pressing out and inflating synthetic material tubes of the type having a press cylinder for containing the synthetic material, a nozzle neck defining the end of the cylinder, a piston displaceable within the cylinder for forcing the material through the nozzle neck, a mandrel within the cylinder and cooperable with the nozzle neck to provide an annular nozzle, a plurality of radially displaceable segments and a tubular shaped part, the segments when closed together defining the outer part and the upper part of a head mold for forming the tube neck, with the tubular shaped part defining the cavity of the tube neck, means for moving the segments and the tubular shaped part in an axial direction from and toward said annular nozzle, said tubular shaped part after completion of the axial movement of said mold from said annular nozzle being movable axially with respect to said segments so far that its lower end is withdrawn from inside the closed segments, outwardly directed resilient arms against which said segments rest, a bushing to which the upper ends of said arms are secured, an axially movable sleeve in which said bushing is slidable, said segments having conical surfaces which during relative movement to the sleeve touch the edge of the sleeve whereby the segments are closed, an axially displaceable shut-off conduit surrounding said mandrel, and the wall thickness of said conduit corresponding to the breadth of the annular nozzle defined by the nozzle neck and the mandrel.

2. An assembly as claimed in claim 1, in which the cavity of the annular nozzle defined by the nozzle neck and the mandrel has a volume equal to the volume necessary to form a base for the tube.

References Cited in the file of this patent

UNITED STATES PATENTS

| 752,597 | Schieves | Feb. 15, 1904 |
| 1,939,831 | Scheible | Dec. 19, 1933 |
| 2,262,612 | Kopitke | Nov. 11, 1941 |
| 2,288,454 | Hobson | June 30, 1942 |
| 2,358,857 | Gits | Sept. 26, 1944 |
| 2,562,523 | Brunet | July 31, 1951 |
| 2,710,987 | Sherman | June 21, 1955 |
| 2,804,654 | Sherman | Sept. 3, 1957 |
| 2,812,548 | Quinche et al. | Nov. 12, 1957 |
| 2,817,115 | Freifeld | Dec. 24, 1957 |
| 2,878,520 | Mumford et al. | Mar. 24, 1959 |
| 2,891,283 | Cramer et al. | June 23, 1959 |
| 2,896,251 | Sherman | July 28, 1959 |

FOREIGN PATENTS

| 1,114,897 | France | Dec. 26, 1955 |
| 937,078 | Germany | Dec. 29, 1955 |